3,413,182
PATTERNED NON-WOVEN FABRICS COMPRISING
ELECTRICALLY-SPUN POLYMERIC FILAMENTS
Harold L. Simons, West Newton, Mass., assignor to The
Kendall Company, Boston, Mass., a corporation of
Massachusetts
Original application Jan. 15, 1963, Ser. No. 251,693, now
Patent No. 3,280,229, dated Oct. 18, 1966. Divided and
this application Feb. 21, 1966, Ser. No. 574,477
6 Claims. (Cl. 161—112)

ABSTRACT OF THE DISCLOSURE

A textured non-woven fabric which may or may not be laminated to other non-conducting material, the fabric being formed of electrically-spun autogenously bonded filaments of an organic polymeric material wherein at least the majority of the filaments have a length-to-thickness ratio greater than about 10,000 to 1 and the filaments are aggregated into a pattern of intersecting and coalescing bundles integrated into a net-like arrangement and wherein the space between the bundles have substantially fewer filaments.

---

This is a divisional application of Ser. 251,693, now U.S. Patent No. 3,280,229, issued Oct. 18, 1966.

This invention relates to patterned and textured non-woven fabrics. More particularly, it relates to non-woven fabrics wherein electrically-spun filaments are aggregated into bundles or clusters defining a controlled pattern of aggregates of high-filament density contrasting with controlled areas of low-filament density. The non-woven fabrics of this invention may be made ultra-thin and ultra-light in weight, and may replicate a wide variety of patterns, as set forth below.

Conventional non-woven fabrics are an important article of commerce, widely known and recognized in the textile art. Customarily they are made by binding together the fibers in a fibrous sheet or fleece, the fibers being either uniformly distributed, textured into thick and thin areas, or even with the fibers grouped together into intersecting bundles, with apertures or substantially void areas between bundles.

Prior art non-woven fabrics, however, are limited in their range of applicability by several factors. Since they are composed of textile fibers, the lightest weight conventional non-woven fabric is the weight of the fleece derived from one or two card machines or the like. Since such fleeces are fragile, and since they must be processed through equipment to effect the bonding step, the lower weight limit of available non-woven fabrics is in the vicinity of 12 to 16 grams per square yard.

Such fabrics are further limited in the chemical nature of the fibers of which they are composed. Although a wide variety of synthetc organic polymers are available in fiber form, there are many more which are either not commercially available, or cannot readily be converted into fibers, or if available, cannot be processed on conventional textile machinery due to considerations of fiber fineness, static interference, or other hindrances.

I have found that it is possible to produce a wide variety of non-woven fabrics, either of uniform fiber distribution, or more particularly with the filaments aggregated into any desired pattern or network of aggregates resembling a wide variety of woven, knitted, or netted fabrics. I have similarly found how to produce such fabrics in an economical weight-range which is only a fraction of the lightest weight woven or non-woven fabric commercially available. Additionally, I am able to produce such products from a variety of synthetic organic polymers which are not available in textile fiber form.

In the practice of my invention I utilize the process which has become known in the art as "electrical spinning," as defined in U.S. Patents 1,975,504 and 2,116,942 to A. Formhals, and as set forth, among other patents, in early Patents 692,631 to J. F. Cooley and 705,691 to W. J. Morton. It has long been known that various polymeric materials dissolved in a solvent of relatively high dielectric constant may be "electrically spun." That is, if such a solution of appropriate viscosity is placed in a reservoir connected to an open capillary tube, the imposition on the solution of a high electrical potential, of the order of 5,000 to 20,000 volts, will cause a stream of fine filaments of the polymeric substance to issue from the open end of the capillary. Various improvements and modifications have been made in the basic procedure, to increase the parallelization of the fibers, or to control their naturally random distribution in the air or on a collecting device, but to the best of my knowledge, such modifications were generally designed for the purpose of facilitating the spinning of such electrically-spun filaments into yarns. U.S. Patent 2,048,651, to C. L. Norton, describes an electrical spinning procedure for the production of fibrous masses suited for packing, insulation, or similar purposes. My invention, however, makes it possible for the first time for the spun fibers to be gathered into a thin, lightweight non-woven fabric with a pattern simulating any desired woven fabric, and even going beyond the scope of known fabric patterns or textures in both weight of product, chemical nature of the fibers, and replication of patterns which cannot be duplicated by any known textile machinery using yarns as the design-forming member.

In conducting an electrical spinning process, use is frequently made of a two-electrode system: that is, one electrode, usually the positive, is immersed in the polymer solution, or makes contact with the walls of the solution container. The receiving device on which the electrically-spun filaments are collected will in this case be grounded.

I have found that novel and useful patterned arrays of electrically-spun fibers can be produced by collecting such fibers on what I call a segmented receiver. By a segmented receiver I mean a fiber-collecting device made up of at least two sets of elements which are capable of being maintained at potentials which differ from each other, so that the charged fibers are preferentially attracted to one set of elements in the receiver at the expense of the other set of elements. In general, the set of elements which attract the fibers should be interconnected and maintained at the same potential, so that the fibers are deposited in a continuous sheet, to form a non-woven fabric, rather than in the form of a tow, a sliver, or a set of unconnected fibrous aggregates. One simple example of a segmented receiver useful in the practice of this invention is a revolving metal drum with a pattern of holes drilled through the surface shell. If the continuous metallic shell is grounded and a stream of positively charged electrically spun fibers is directed thereto, the fibers are formed into a sheet, replicating the metallic surface of the drum, said sheet being patterned by a series of apertures of low or zero fiber density replicating the holes in the drum surface.

The invention will be more clearly understood by reference to the drawings, in which.

Figure 1:
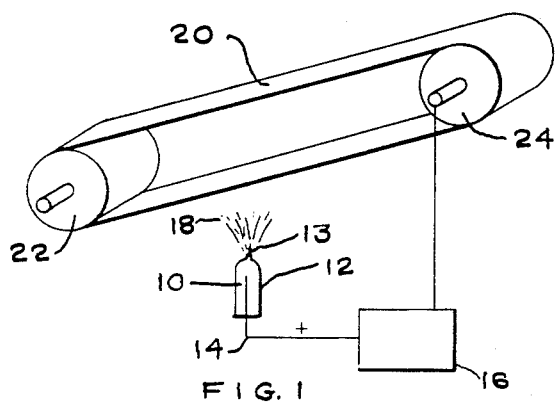
FIGURE 1 is an isometric view of an apparatus useful in carrying out the process.
Figure 2:
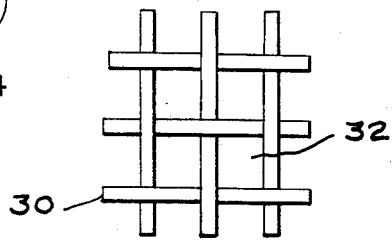
FIGURE 2 is a plan view of an element of the segmented receiver 20 of FIGURE 1.
Figure 3:
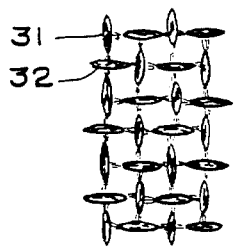
FIGURE 3 is a plan view of the textured non-woven fabric made according to this invention employing the segmented receiver of FIGURE 2.

Referring to FIGURE 1 in more detail, a suitable polymeric solution, 10 as described more fully below, is contained in a cylindrical tube 12, conventional of glass, drawn to a fine capillary point 13. An electrode 14, suitably a metal wire, is immersed in the polymer solution 10 and is connected to a suitable power source 16 that will preferably supply a continuously variable direct current voltage up to 20,000 volts. With the power source as shown in FIGURE 1 impressing a positive potential on the polymer solution, the negative side of the power source is grounded together with the conductive portions of the segmented receiver 20. In the illustrated embodiment, the segmented receiver is a metallic screen, driven by rolls 22 and 24 by means of which the receiver is grounded. Alternatively, the segmented receiver may be a drum, the surface of which is perforated, and with the surface grounded through the drum axis. The coarse-meshed screen illustrated is shown enlarged in FIGURE 2, and yields the product of FIGURE 3. A section of the surface of a metal drum 34, provided with perforations 36, is shown, flattened out, in FIGURE 4, with the corresponding product in FIGURE 5.

The apparatus of FIGURE 1 may be operated with the reservoir below the receiver, as shown, or the reservoir may be placed above the receiver, or at an angle to it. The former is the preferred method, since any droplets or drippings will accumulate around the orifice and will not drop by gravity onto the patterned non-woven fabric being produced. A horizontally-disposed reservoir combined with a vertically-disposed receiver is another alternative.

A wide variety of organic polymeric substances may be used to form patterned non-woven fabrics according to this invention, including cellulose esters and ethers, vinyl resins, acrylic resisn, polystyrene, polyurethanes, polycarbonates, and the like. Practical considerations of desired fiber fineness, amount of solvent to be evaporated, and the like, suggest certain criteria for selecting the solvent-solute system for optimum smoothness of operation. Since a certain amount of solvent is evaporated in this process, it will be apparent that changing the viscosity of the solution will change not only the flow rate from the reservoir but will affect the fiber diameter, the thinnest fibers being produced from solutions of the lowest viscosity.

I have found in general that it is desirable to operate at solutions of between 7% and 35% concentration, in order to obtain as much final product as possible from a given amount of solution. The upper limit of concentration will be dictated to some extent by the viscosity of the solution. In general, I have found it desirable to use concenrations well below the gel stage, since the use of gels seems to promote the formation of coarse fibers and occasions droplets. My preference is for solutions which have a viscosity of 1,500 centipoises or less, at a 15% or higher concentration at operating temperature. It will be apparent to those skilled in the art that these conditions may be met by a wide variety of polymers in a wide variety of solvents, or that mixed solvents may be used to regulate viscosity or dielectric constant, the choice of solvents being governed by my general observation that a solvent with a relatively high dielectric constant is desirable. A more detailed discussion of the variables in the process will be found hereinbelow.

The potential impressed on the polymer solution 10 by means of the electrode 14 will vary with the type of solution employed, the degree of fiber fineness desired, and the distance between the capillary 13 and the segmented receiver 20. Such operating variables are known in the art, and will not be elaborated upon except to say that with a positive potential of 5,000 to 20,000 volts impressed upon the polymer solution and a distance between capillary and receiver of from 4 to 20 inches, a wide variety of polymer solutions may be electrically spun into textured non-woven fabrics by the process of this invention.

It is also known in the art of electrical spinning to insert various guides or baffles, kept at a suitable potential, to direct the flow of filamentary material to the receiver, to aid in more efficient collection and deposition. Such auxiliary devices may be used if desired, but form no part of this invention and are not claimed as such.

In operation, the desired polymer solution 10 is placed in the reservoir 12 which terminates in a capillary tube 13. As the level of solution in the reservoir 12 is lowered during production, fresh solution is provided by conventional means not shown. It will be apparent to those skilled in the art that a multiplicity of reservoirs may be placed side by side to cover a wide area of segmented receiver, or a multiplicity of reservoirs may be placed in a row parallel to the direction of rotation of the receiver. In the latter arrangement, each stream of filaments is successively deposited on and is intermingled with the stream from the preceding reservoir, so that the weight of the product is doubled, tripled, or quadrupled as two, three, or four reservoirs are brought into operation. Such is the nature of the peculiarities of electrical spinning, however, that this tandem type of operation does not yield two to four separate fabrics loosely laid together, but instead yields a single, well-integrated fabric of increased weight. This may be due to the high static forces which hold such fine fibers together, or to the fact that as the fibers are gathered on the segmented receiver, they are in a somewhat nascent state, and adhere to each other due to traces of residual solvent. Whether static forces or actual fiber-to-fiber adhesion is responsible for the strength of the product of this invention, the product in either case is autogenously bonded: that is, it is held together by the actual fiber substance, without the interposition of a second component binder system, whether the material is the product of a single reservoir or a multiplicity thereof.

Various other combinations of reservoirs will occur to those skilled in the art, including series-parallel arrangements where certain sections of the fabric are reinforced by double or triple deposition while other sections of the fabric receive the output from only a single reservoir.

With the reservoirs in place, and in operating condition, the segmented receiver is started up and a potential is impressed on the polymer solution in the reservoir system.

I have found that as a general rule, when operating between 5,000 and 20,000 volts, a spacing of about 10 inches between the capillaries and the receiver is a convenient distance.

At a certain critical potential, characteristic of the solvent-solute system chosen, a stream of filaments 18 will be seen to issue from the capillary orifice 13 and to be almost immediately deposited on the segmented receiver 20. In general, for a given solution, the higher the potential difference between the solution and the receiver, the finer the fibers.

Since the electrically-spun fibers are generally rather long, there is some tendency for fibers to bridge over the thin areas of non-woven fabrics deposited on the segmented receivers of this invention. Although the fibers are principally attracted to the conductive section of the receiver, the product of FIGURE 5, for example, may show a light veil of fibers filming over the apertures 36. Lightweight fabrics of this invention are usually quite flexible and readily deformed: a stretching operation, combined with passing the fabric over a roll provided with protuberances which register with the apertures 36 will serve to open the structure by rupturing any fibers which tend to bridge across the apertures. Alternatively, a rubbing operation may be used in which the fabric is subjected to the oscillating action of a pair of felt belts or rollers. If such expedients are undesirable, recourse may be had to a segmented receiver of the nature of the one shown in FIGURES 8 and 9, which may be regarded as a three-element receiver.

Figure 8:
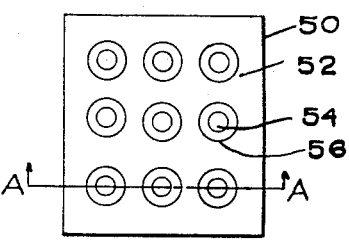
FIGURE 8 is a top view of a three-element segmented receiver.
Figure 9:
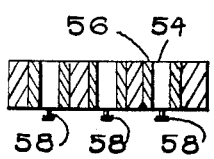
FIGURE 9 is a front elevation cross-section of the receiver of FIGURE 8 across the line A—A.

In a receiver of this type, shown in top view in FIGURE 8, a conductive continuum is provided by a metal plate or sheet 50, which carries a pattern of apertures 52 of any desired shape, arrayed in any desired pattern. These apertures comprise a central conductive element 54, conveniently a metal plug, insulated from the continuous section 50 of the receiver by an insulating collar or washer 56, which may conveniently be formed from a non-conducting plastic material. As shown in FIGURE 9, which is a cross-section along the line A—A of FIGURE 8, the conductive center islands are provided with binding posts 58, to allow the islands to be connected to a desired source of potential.

In the operation of a three-element receiver of this sort, a stream of positively charged electrically-spun filaments is directed toward the receiver, the continuous section 50 of which is grounded. At the same time a positive potential is applied to the central islands 54 of the apertures 52. Under these conditions those positively charged fibers which might have been lightly and randomly distributed across the apertures if the apertures were merely an air gap, are strongly repelled by the positive charge on the island 52 and are aggregated onto the continuous element 50, whereon they define very definite and substantially fiber free apertures. I have found, for example, that when a positive potential of 9 to 12 kilovolts is used to impel the fibers from the reservoir, and the continuous section 50 of the segmented receiver is kept at ground, a positive potential of from 3 to 5 kilovolts applied to the center island 54 results in the apertures in the resulting nonwoven fabric being substantially free of fibers, as shown in detail in FIGURE 10.

Instead of the binding posts 58, other provision for interconnecting the center island areas may be used, or they may be permanently wired together. The advantage of separable connecting devices is that certain islands or groups of islands may be connected to one source of potential and others to a source of different potential, thereby leading to a variety of patterned non-woven fabrics utilizing the same segmented receiver.

Figure 4:
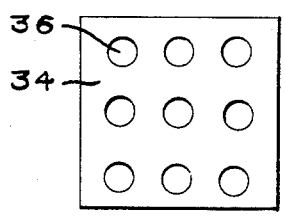
FIGURE 4 is a plan view of another type of segmented receiver.
Figure 5:
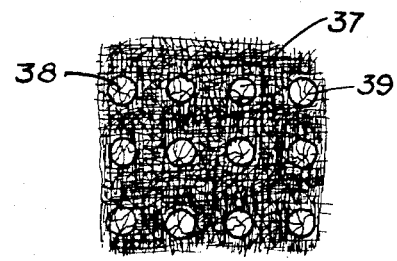
FIGURE 5 is a plan view of the non-woven fabric made using the receiver of FIGURE 4.

Even when no positive potential is applied to the central islands of the segmented receiver of FIGURES 8 and 9, a receiver of this type gives more clearly defined apertures than a receiver of the type shown in FIGURE 4. In the latter case, the holes in the receiver, being a void air space, have low conductivity, and those fibers which do cross the aperture will retain part of their charge for a time. In the case of the receiver of FIGURE 8, the positively charged fibers which impinge on the center island 54 give up their charge to the metallic island. These islands, insulated by the insulating elements 56 from the grounded section 50, acquire a positive space charge from the fibers which impinge thereon, and rapidly take on a repellant effect to the positively charged fibers, almost as if a separate positive charge had been applied to the islands.

Figure 10:
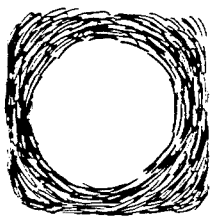
FIGURE 10 is one product made on the receiver of FIGURES 8 and 9.
Figure 11:
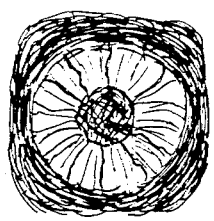
FIGURE 11 is another product made on the receiver of FIGURES 8 and 9.

When both the islands 54 and the continuous element 50 of the three-segment receiver of FIGURE 10 are grounded, the product of FIGURE 11 is obtained, wherein there is a concentration of fibers on both grounded elements, with a ray-like bridging effect crossing the insulating collars 56.

Figure 12:
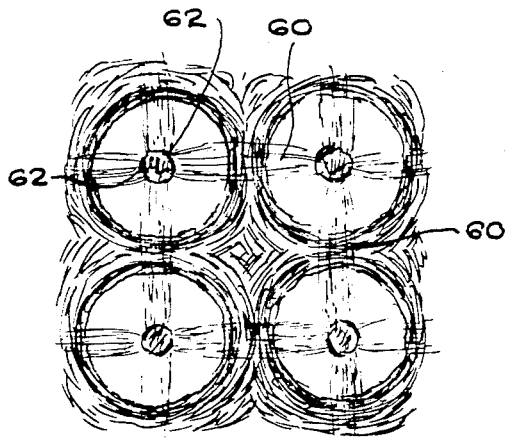
FIGURE 12 is still another product made on the receiver of FIGURES 8 and 9.

Particularly interesting but as yet unexplained results are obtained when an alternating current is applied to the islands 54 of the receiver of FIGURE 10. FIGURE 12 represents a patterned non-woven fabric made on the receiver of FIGURE 8 by applying a D.C. potential of 8,000 volts to a 25% solution of Vinylite VYHH in methyl ethyl ketone: maintaining the continuous element 50 of the receiver at ground; and applying an A.C. potential of 4,700 volts to the center islands 54. Both the continuous section 50 and the islands 54 are well covered with fibers, and the structure is marked by disperse fibrous bands, like magnetic force line patterns, 60, connecting the islands. Additionally, the fiber distribution on the islands is marked by a crescent-like higher concentration of fibers, 62, said concentration presumably being associated with a rim or edge effect frequently met with in electrical phenomena.

Although A.C. voltage on certain sections of a multi-segmented receiver is thus seen to produce novel non-woven fabrics, the use of A.C. voltages as the primary fiber-spinning force is more difficult than the use of direct current, in my experience. With the receiver 20 of FIGURE 1 grounded, a potential of 7,000 to 10,000 volts A.C. at a frequency of 60 cycles was applied to the electrode 14 immersed in a solution of 25% Vinylite VYHH in methyl ethyl ketone. The rapid frequency alteration caused the fibers to be in general rather malformed, with thick and thin places along the fiber length. Moreover, many of the fibers tended to roll up on themselves to form twisted balls, as if successive sections of a single fiber were oppositely charged and the relatively non-conducting fiber was responding to this spatial charge imbalance by drawing its ends together and collapsing into a tangled snarl. Presumably this behavior is a function of the frequency—that is, the rapidity with which alternate positive and negative charge is impressed on the nascent fiber—together with considerations concerning fiber length, rigidity, and fineness. In view of the necessity of matching the frequency of alternating current to the other parameters of the process, I prefer in general to use D.C. voltage as the primary fiber-spinning force.

Additionally, I have found it most convenient to apply the D.C. voltage to the electrode immersed in the solution of material to be spun. In this case, fibrillation of the solvent stream into fibers takes place at or near the orifice of the reservoir, and the fibers, being similarly charged, tend to repel each other, whereby they are dispersed over a relatively wide area and patterned non-woven fabrics of substantial width can be made. If, however, the reservoir is grounded and the segmented receiver is charged positively, fibrillation is seen to take place only when the stream reaches the vicinity of the receiver. As a consequence, the fibers in this latter case are deposited over only a small area of the receiver, and coverage is poor. Also, the effective working distance between reservoir and receiver is shortened, and a higher driving potential is required. In general, under these conditions, the spacing between grounded reservoir and positively charged receiver cannot be more than about 7 inches from fiber disposition, whereas working distances up to 20 inches are feasible with a positively charged reservoir and a grounded receiver. Presumably, in the case of grounded reservoir and positively charged receiver, fibrillation is initiated by induction, and is less efficient than initiation by conduction as in the case of a positively charged reservoir.

In addition to the influences of the nature, magnitude, and placement of the electric potential, as set forth above, the parameters of viscosity, dielectric constant, conductivity, and solvent volatility have a bearing on the efficiency of the process of this invention. As will be apparent to those skilled in the art, these parameters are often interdependent.

Viscosity

I have found it possible to form non-woven fabrics from polymer solutions ranging in viscosity from 100 to 3,000 centipoises. However, these limits are not wholly independent of the solvent, solute, and electrical properties of the system. In general, best results are obtained with viscosities between 300 and 1,500 centipoises. At low viscosities, the fibers tend to be shorter and finer; at high viscosities the fibers appear to be relatively continuous, and coarser. Polymers of high molecular weight are generally more difficult to spin, presumably due to the rapid rise in viscosity after a small amount of solvent evaporation has taken place during the spinning operation. In using polymers of high molecular weight, therefore, it is advantageous to use a particularly low viscosity solution. With solutions of extra low viscosity, a dust of dried spray droplets is formed, rather than fibers.

Dielectric constant

Solvents with dielectric constants from about 2 (hydrocarbons) to 78 (water) have been explored in this process. In general, best results are obtained when the dielectric constant is in the range of from about 5 to about 21.

Ketones such as acetone, methyl ethyl ketone, and methyl isobutyl ketone, with dielectric constants ranging from 12 to 21, will yield patterned non-woven fabrics with fine fibers of from one to three microns diameter. Esters, with dielectric constants of 6 to 8, yield coarser fibers under similar conditions. Chloroform, with a dielectric constant of about 5, yields still coarser fibers, up to 10 microns in diameter. In general, toluene, with a dielectric constant of 2.3, does not yield satisfactory fibers.

Solvents with a dielectric constant of above 21 are also liable to result in unsatisfactory fiber formation. This may not be due to dielectric constant per se, however, but may be due to the high conductivity and low volatility which are normally associated with solvents of high dielectric constant, as discussed below.

Conductivity

The conductivity of the polymeric solution has a direct influence on the electrical spinning of non-woven fabrics. In general, it is advisable not to exceed a specific conductivity of $2 \times 10^{-6}$ reciprocal ohm-centimeters, although with sufficiently low flow rates somewhat higher conductivities are permissible. This behavior seems to hold true whether the conductivity is influenced by naturally-occurring impurities in the solvent or polymer, or whether it derives from the deliberate addition of an ionizable impurity.

Volatility

For optimum formation of non-woven fabrics with high fidelity of pattern replicating the segmented receiver, it is desirable that the solvent associated with the polymer solution be substantially completely removed from the fibers at the time of their deposition on the receiver. Although a certain amount of fiber-to-fiber adhesion is permissible, it is preferable that the fibers not to be deposited in a solvated state. In general, solvents such as dimethyl formamide (boiling point 153°) and butyrolactone (boiling point 206°), although good solvents for a variety of polymers, tend to yield wet and somewhat solvated fibers in the process of this invention when the process is carried out at room temperature. If the process is conducted at elevated temperatures, solvents may be used which would not be so suitable at room temperature.

By maintaining the proper potential difference between the filamentary stream and the elements of the segmented receiver, an amazingly faithful positive replication of the receiver can be effected. I have produced textured non-woven fabrics from a perforated metal plate with as many as 50 apertures to the linear inch, and from a coarse metal grid in which the elliptical apertures are one-half inch in the minor axis by one inch across the major axis. Particularly in case of using coarser-meshed receivers, the resulting non-woven fabrics are essentially apertured— that is, so few filaments cross the spaces between the grounded and interconnected segments of the receiver that for most purposes the fabric behaves as though there were no fibers there at all. It is a characteristic of the process of this invention that the fibers replicate the pattern of the receiver in three dimensions: that is, if portions of the receiver project above the general receiver plane, the fibers aggregate on the raised portions in greater concentration than elsewhere on the receiver. Such an effect is characteristic of products made on a woven wire screen, FIGURE 3 and Example 2 below, where the wire knuckles of the crossover points in the screen are elevated from the screen surface. The fidelity of replication is so detailed and fine grained that if a stream of charged fibers is directed to the human hand held a few inches from the reservoir orifice, the fibrous sheet when removed from the hand will be found to duplicate in detail the lines and irregularities of the hand, down to the whorls and ridges of fingerprints.

Figure 7:
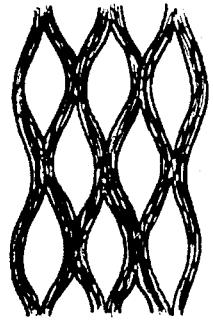
FIGURE 7 is still another embodiment of the product of this invention.

As shown in detail in FIGURE 7, the filaments comprising the patterned non-woven fabrics of this invention are aggregated into generally flat bands with rather sharply defined edges. Within these bands the filaments are rather well parallelized, but due perhaps to the violence of the flight of the filament stream to the segmented receiver, and to inter-filament repellance while competing for space on the segments to which they are drawn, this parallelization is characterized by a marked fiber overlaying which lends strength to the individual bands and integrity to the integrated network of bands which comprise the structure.

In addition to the advantage of being able to produce textured non-woven fabrics from polymers which are not commercially available in fibrous form, my invention allows alteration in the physical characteristics of any given polymer by the inclusion of a second solute in the polymer solution. For example, a normally hydrophobic fiber formed from a copolymer of vinyl chloride and vinyl acetate can be converted into a hydrophilic, readily-wettable filament by the inclusion in the spinning bath of a suitable wetting agent, as illustrated in Example 4.

The following examples will illustrate various methods of carrying out my invention, without limiting the invention thereto.

Example I

A 12% solution in methyl ethyl ketone of a polyurethane resin Estane 5740-xI by B. F. Goodrich was placed in the reservoir 12 of FIGURE 1, equipped with an 18 gauge hypodermic needle as the outlet 13. A perforated metal plate, similar to that of FIGURE 4, was employed as a segmented receiver, the perforations being 1/16 inch in diameter, six holes per inch, in staggered rows. When a positive D.C. potential of 5,000 volts was applied to the electrode 14 and the grounded segmented receiver held about six inches below the tip of the needle 13, an apertured fabric was obtained as a replication of the receiver. The fabric, weighing eight grams per square yard, is shown in magnified detail in FIGURE 5, wherein a continuous fabric 37 is patterned with apertures 38, said apertures being crossed by occassional fibers 39.

Example II

The same conditions prevailed as in Example I except that a grounded woven wire screen was used as a segmented receiver. The screen, woven 11 wires to the inch each way, was replicated to form the non-woven fabric of FIGURE 3 weighing eight grams per square yard. It will be noted that due to the fact that a woven wire screen is not perfectly planar, the fibers tended to collect on the knuckles or raised wire portions of the screen, as shown at 31 in FIGURE 3. In this instance there were numerous fibers bridging the apertures, but they were so fine as to be almost invisible. The fabric of this example would retain drops of water placed thereon, but so thin and tenuous is the veiling over the apertures that the product has a very high rate of moisture vapor transmission.

Example III

Figure 6:
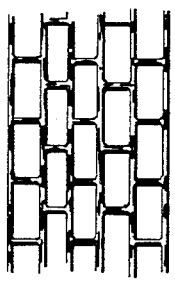
FIGURE 6 is another embodiment of the product of this invention.

Using a perforated metal grillwork as a grounded segmented receiver, the same solution and other settings as in Examples I and II were used to produce the patterned non-woven fabric of FIGURE 6. This material, weighing about 2.8 grams per square yard, had water transmitting and moisture-vapor transmitting properties similar to those of Example II.

Example IV

A 20% solution in methylene chloride was prepared using a polycarbonate resin, Lexan 105, a product of General Electric. Using still another type of metallic grill as a grounded segmented receiver, 15 inches from the needle orifice 13 of the reservoir, the product of FIGURE 7 was obtained when a D.C. potential of 10,000 volts was applied to the electrode 14. The product weighed 11.6 grams per square yard.

In addition to the above examples of patterned non-woven fabrics from electrically-spun filaments, I have found that it is possible to produce a variety of composite materials where an electrically-spun non-woven fabric is combined with a layer of film, paper, cloth, or the like. The arrangement of the electrically-spun fibers will vary with the conductivity of the substrate which is placed between the receiver and the fiber source, as well as with the nature of the receiver, as will appear from the following examples.

Example V

A 10% solution of a polyurethane resin (Estane 5740-xI) was prepared using equal parts of methyl ethyl ketone and tetrahydrofurane as solvent. Using the apparatus of FIGURE 1, with a positive potential of 10,000 volts applied to the reservoir, the stream of filaments was directed toward an open-meshed cotton gauze fabric lying on a solid metal plate, which was grounded. The cotton fabric was dry, and an ambient low humidity was maintained.

Figure 13:
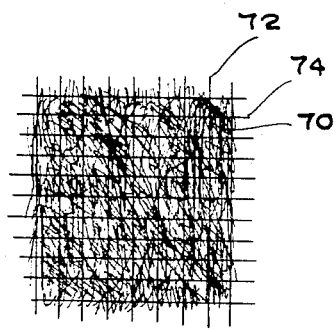
FIGURES 13 through 17 represent embodiments of this invention wherein an array of electrically-spun filaments has been deposited on a fabric, film, or similar substrate to form a composite assembly.

The resulting product, shown in FIGURE 13, consisted of a substantially uniform sheet of polyurethane fibers, 70, deposited on a gauze fabric of warp yarns 72 and filling yarns 74.

Example VI

Figure 14:
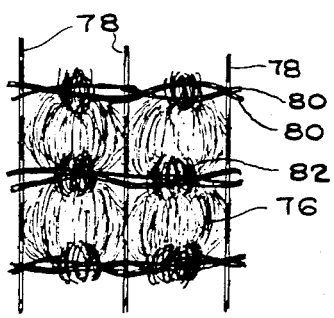

Using the same apparatus, a positive potential of 10,000 volts was applied to a 20% solution of Lexan polycarbonate resin in methylene chloride. The filaments were directed toward an open-mesh Leno weave fabric supported on a grounded solid metal plate, the fabric having been previously conditioned at 100% relative humidity. The product of FIGURE 14 was obtained.

The high moisture content of the fabric renders it somewhat conducting, so that the fibers 76 are deposited over the interstices of the fabric with a marked display of fibrous nodes or aggregations, 82, said nodes occurring wherever the warp yarns 80 cross over each other in the spaces between filling yarns 78. The typical crossover Leno weave raises the warp yarns sufficiently from the surface of the fabric to constitute a preferred point of attraction for the positively charged fibers.

Example VII

Using the same solution and general conditions as in Example V, the filaments were directed to the same open-meshed gauze-like fabric, except that in the present example the fabric was previously wet with water and squeezed to 150–200% moisture content. The product of FIGURE 15 was obtained.

Figure 15:
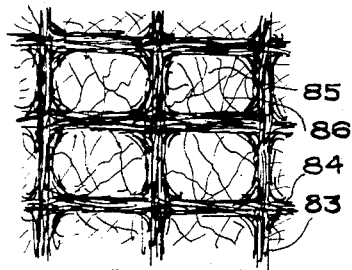

In FIGURE 15, which is magnified about four times, the electrically-spun filaments are aggregated into interconnected fibrous bundles which reproduce the warp yarns 83 and filling yarns 84 of the underlying fabric to define apertures 85 which are traversed by occasional filaments 86. It should be pointed out that whereas in FIGURE 13 the yarns 72 and 74 of the fabric are clearly visible and the electrically-spun filaments are in a uniform film-like deposit, in FIGURE 15 the yarns of hte fabric are completely obsecured by a deposit of bundled filaments, due presumably to the more conductive nature of the fabric in this case.

Example VIII

Figure 16:
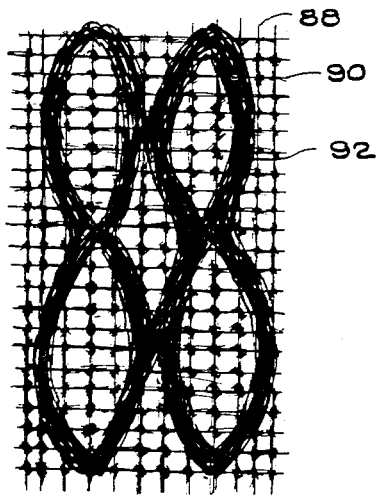

Using the same solution and general conditions as in Example V, the filaments were directed toward an open-meshed gauze, dampened with 150–200% water, lying on a grounded segmented receiver similar to the receiver used in Example III. The product of FIGURE 16 was obtained.

In this case, apparently both the somewhat conductive fabric and the grounded segmented metal grillwork influence the deposition of filaments, since the former is reproduced as a set of interconnected filamentary bundles defining the warp 88 and weft 90 of the fabric, while the segmented reciver is faithfully reproduced as a series of fibrous bands 92, the filaments reproducing the yarns and the filaments reproducing the segmented receiver being interconnected in a duplex reproduction pattern.

Example IX

Figure 17:
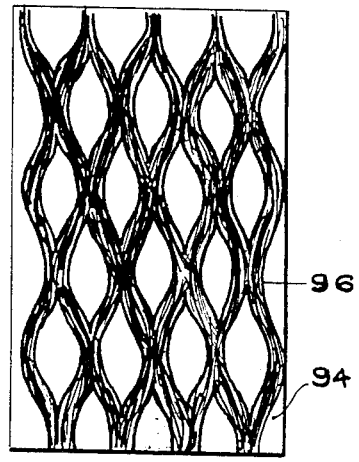

Using the same general conditions as in Example VIII, the stream of filaments was directed toward the segmented receiver of Example III, upon which was placed a piece of Mylar film, a polyester film by DuPont. The product, shown in FIGURE 17, is a composite of the Mylar film base 94 bearing a reproduction of the segmented receiver in the form of a deposite of interconnected filamentary bands 96. Comparable results are obtained when a dry fabric, sheet of paper, or the like is used instead of Mylar film.

Adhesion between the electrically-spun filamentary pattern and the material on which it is deposited may be effected in a variety of ways. By proper spacing between the solution reservoir and the receiver, the filaments may be deposited in a form in which they contain a trace of solvent, so that they are transiently adhesive when deposited. External adhesive may be applied, or the filaments may be derived from an inherently thermoplastic material so that a subsequent heat-treatment will serve to unite the elements of the composite product.

It should be appreciated that from the general nature of electrical spinning, the filaments produced thereby differ from what is generally regarded as textile fibers—that is, from fibers which can be carded, garnetted, or otherwise assembled on equipment which is common in the nonwoven fabric industry. Electrically-spun fibers, in my invention, I have found to be quite long: in fact, microscopic examination shows that many of the fibers in a fabric of my invention substantially resemble continuous filaments. When the processing conditions are such that shorter fibers are produced, they are so fine in diameter that their length to thickness ratio precludes their being processed on conventional textile equipment. It is recognized in the art that fine fibers, of less than 15 microns in diameter, are more difficult to card or garnett than coarser fibers, and that when fineness is coupled with long staple length, the processing difficulties are compounded. In general, when carding commercial fibers of 1.5 denier, it is customary practice to select a staple length such that the length-to-fineness ratio is not greater than 5,000 to 1. The majority of the fibers produced by electrical spinning according to the process of this invention are less than one denier in fineness, which together with their average length of several inches gives a length-to-fineness ratio of 10,000 to 1 and even up to 30,000 to 1 or finer, extremely fine electrically-spun fibers reaching a ratio of over 50,000 to 1.

While the invention has been described in terms of reservoirs provided with capillary outlets, from which the polymeric solution emerges as a stream of filaments, the invention is not limited to such a supply source for filaments.

All that is necessary is that a potential be impressed on a properly selected polymeric solution while the solution is disposed in a stream or film. In the above-mentioned 2,048,651 patent to Norton, there is described a reservoir provided with a lip, so that as solution is supplied to the reservoir there is a constant outflow therefrom in the form of a thin stream. In this case the potential-bearing electrode is not immersed in the body of fluid in the reservoir, but is placed in close proximity to the stream of solution issuing from the reservoir, with the consequent production of a stream of charged filaments. Other methods of producing a stream of electrically-spun filaments will readily occur to those skilled in the art.

Having thus described my invention, I claim:

1. A textured non-woven fabric comprising electrically-spun and autogenously bonded filaments of an organic polymeric material, the length-to-thickness ratio of a majority of said filaments being greater than about 10,000 to 1, substantially all of the filaments being aggregated into a pattern of intersecting and coalescing bundles integrated into a net-like arrangement, the space between said bundles having substantially fewer filaments.

2. A textured non-woven fabric as set forth in claim 1 wherein the space between said bundles are devoid of filaments.

3. A textured non-woven fabric as set forth in claim 1 further including a non-conducting material laminated thereto.

4. The product according to claim 3 in which the layer of relatively non-conducting material is a film.

5. The product according to claim 3 in which the layer of relatively non-conducting material is a paper.

6. The product according to claim 3 in which the layer of relatively non-conducting material is a fabric.

References Cited

UNITED STATES PATENTS

| | | | |
|---|---|---|---|
| 3,068,547 | 12/1962 | L'Hommedieu | 161—112 X |
| 2,980,570 | 4/1961 | Cook et al. | 156—30 X |
| 3,016,599 | 1/1962 | Perry | 161—181 X |
| 3,033,721 | 5/1962 | Kalwaites | 161—150 |
| 3,309,260 | 3/1967 | Boese | 161—150 |

ROBERT F. BURNETT, *Primary Examiner.*

P. N. THOMAS, JR., *Assistant Examiner.*